T. E. PARADISE.
VALVE GEAR FOR LOCOMOTIVES.
APPLICATION FILED DEC. 24, 1914.
1,159,600.
Patented Nov. 9, 1915.
3 SHEETS—SHEET 1.
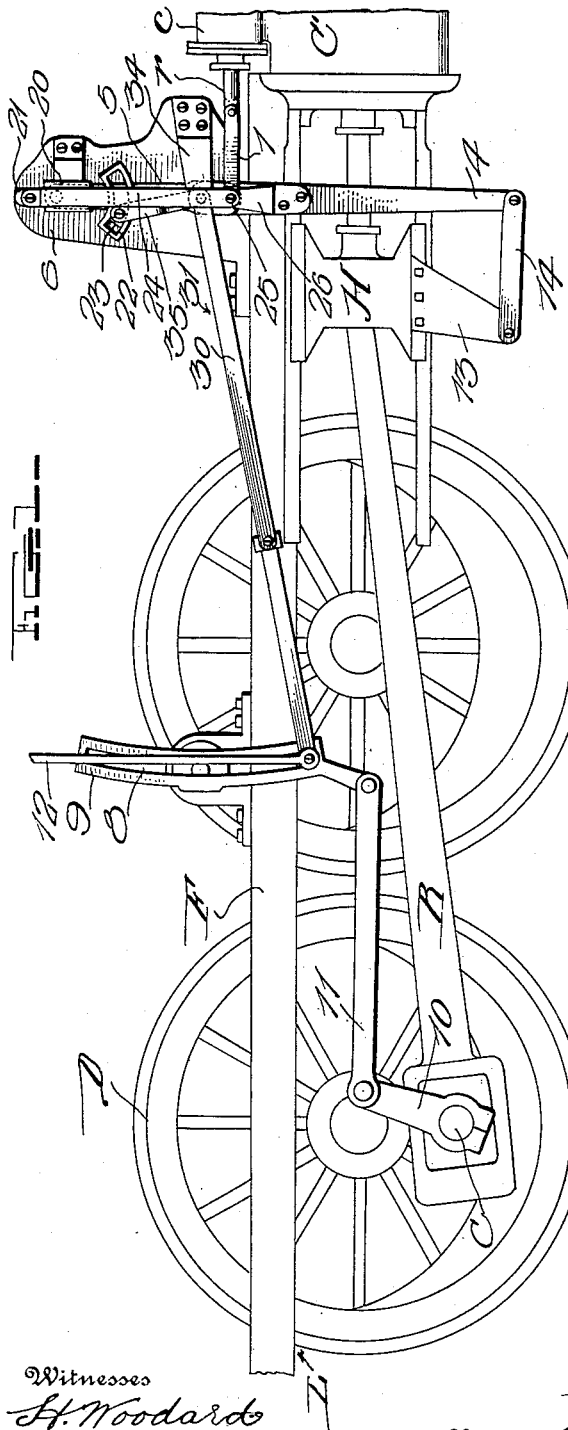
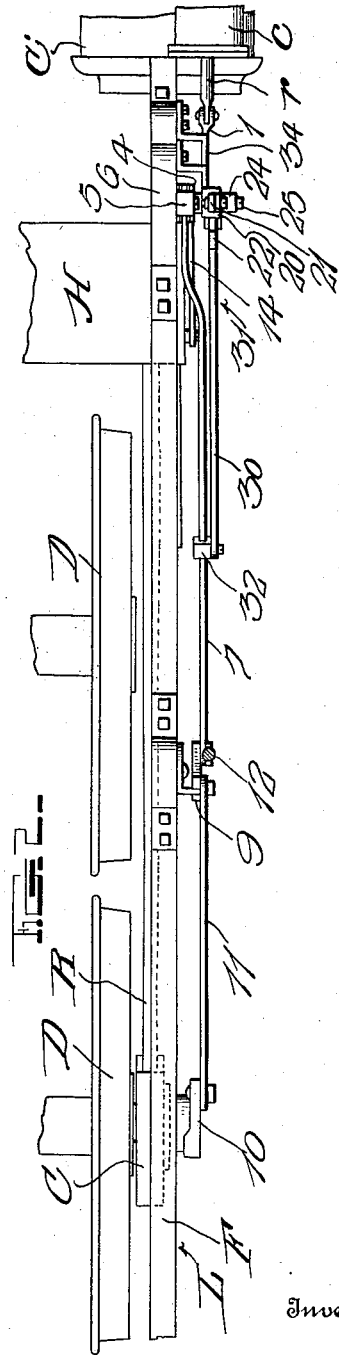
Witnesses
H. Woodard
Inventor
Thomas E. Paradise
By H. B. Willson & Co
Attorneys

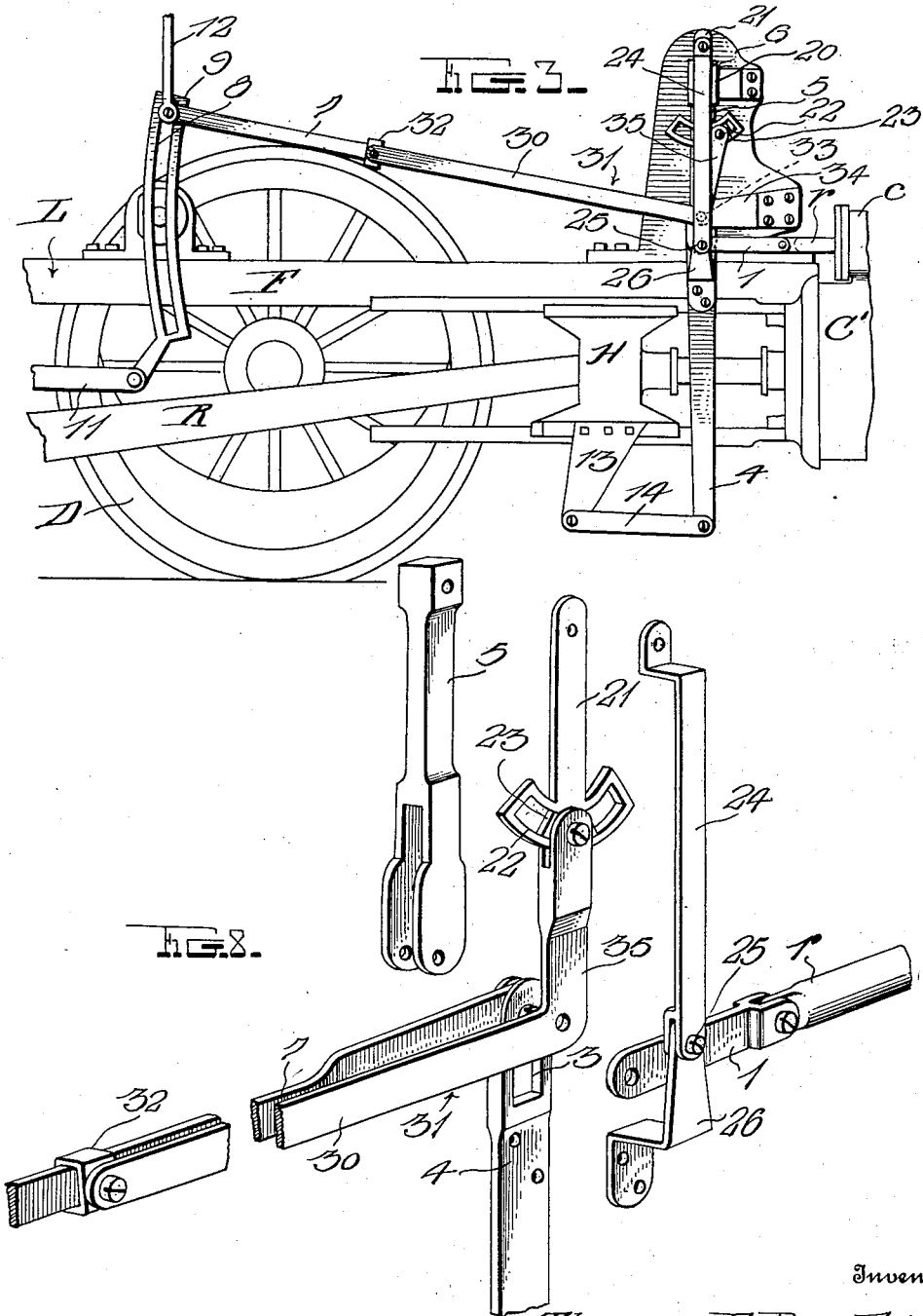

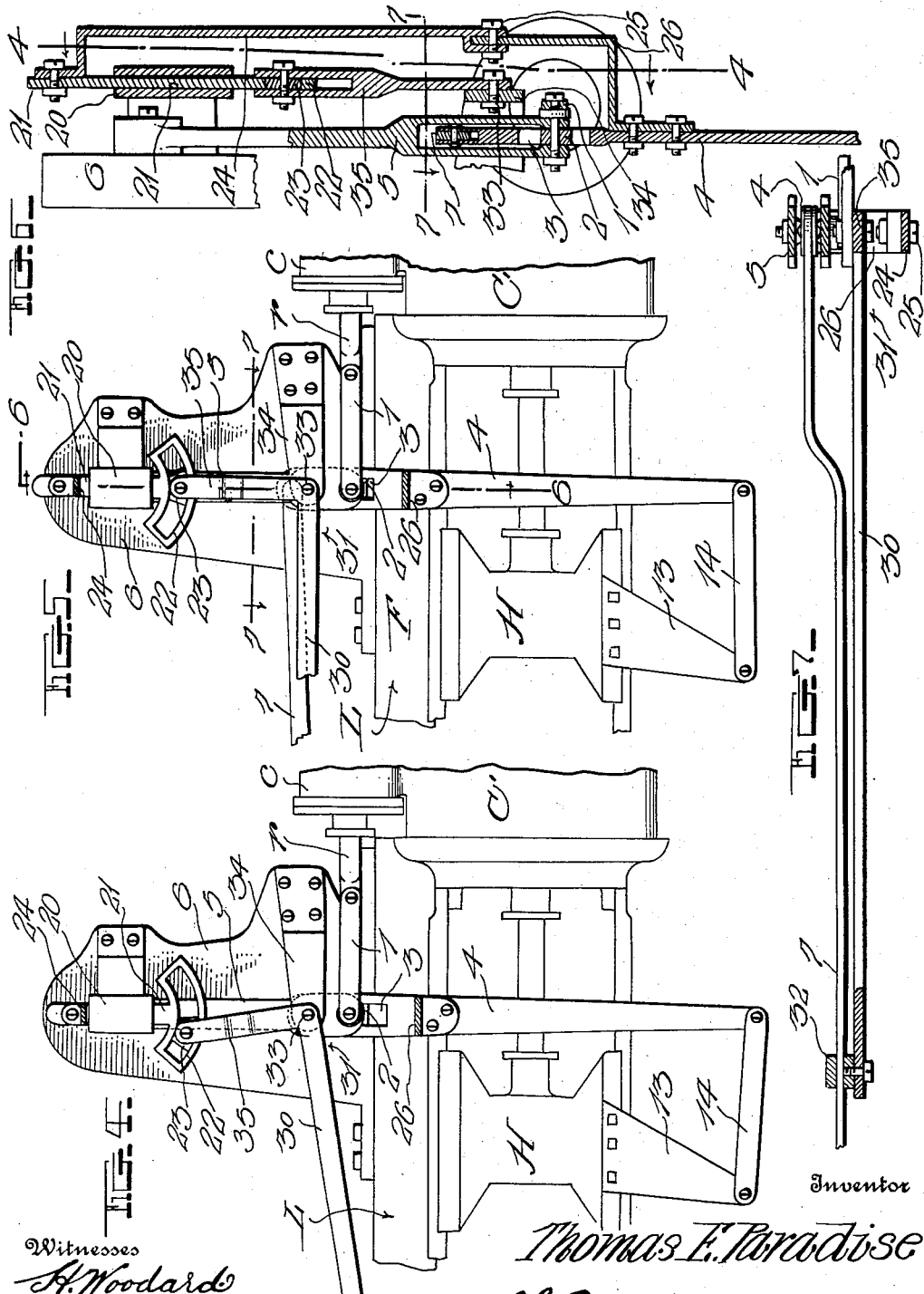

UNITED STATES PATENT OFFICE.

THOMAS ERNEST PARADISE, OF LA CROSSE, WISCONSIN.

VALVE-GEAR FOR LOCOMOTIVES.

1,159,600.  Specification of Letters Patent.  Patented Nov. 9, 1915.

Application filed December 24, 1914. Serial No. 878,869.

*To all whom it may concern:*

Be it known that I, THOMAS E. PARADISE, a citizen of the United States, residing at La Crosse, in the county of La Crosse and State of Wisconsin, have invented certain new and useful Improvements in Valve-Gears for Locomotives; and I do declare the following to be a full, clear, and exact description of the invention, such as will enable others skilled in the art to which it appertains to make and use the same.

My invention relates broadly to improvements in valve gears for use on locomotives and other types of steam engines, and has for its main object to provide comparatively simple yet highly efficient means for varying the distance between the fulcrum of the valve operating lever and its connection with the valve rod, thus varying the stroke or lead of the valve.

To the above end, a further object becomes to provide means whereby this adjustment of the valve operating lever may be made simultaneously with the adjustment of the radius bar commonly employed for reversing and varying the speed of locomotives.

With the above objects in view, the invention resides in certain novel features of construction and combination hereinafter described and claimed and shown in the drawings wherein:

Figure 1 is a side elevation of a portion of a locomotive showing the application of my invention to the valve gear thereof. Fig. 2 is a top plan view of the parts seen in Fig. 1; Fig. 3 is a view similar to Fig. 1, but showing a different position of parts; Figs. 4 and 5 are enlarged side elevations partly in section, these figures being taken substantially on the plane indicated by the line 4—4 of Fig. 6; Fig. 6 is a vertical transverse section on an enlarged scale, as seen on the plane of the line 6—6 of Fig. 5; Fig. 7 is a horizontal section as seen along the plane on the lines 7—7 of Figs. 5 and 6. Fig. 8 is a disassembled perspective view of portions of the invention and the parts with which such portions coact.

In these drawings, constituting a part of this application, a portion of a locomotive L is shown, the latter including the usual running gear including the frame F, drivers D, crank C on one of said drivers, connecting rod R leading forwardly from the crank, cross head H to which said connecting rod is pivoted, cylinder C' in which the usual piston reciprocates to reciprocate the cross head H, valve casing c, and valve operating rod r. The elements so far mentioned form no part of the present invention, although they coact closely therewith in a manner to be set forth.

Connected by means of a link 1 to the rear end of the valve rod r, is a shoe 2 (see more particularly Figs. 4, 5 and 6), this shoe being located within an upright slot 3 of the valve operating lever 4, and being held against vertical movement, to any appreciable extent, by a link 5 which is pivoted at its upper end to an appropriate bracket 6 rising from the frame F, while its lower end is pivotally connected not only with said block, but with the link 1 as most clearly seen in Fig. 6. Pivoted to and leading rearwardly from the upper end of the lever is the usual radius bar 7 whose rear end is provided with an appropriate shoe (not shown) which is adjustable vertically in the arcuate slot 8 of the usual oscillating link 9, this link being pivoted between its ends as is common with devices of this character and being oscillated by a supplemental crank 10 carried by the crank C, through the instrumentality of a connecting rod 11. The usual rod 12 is provided for adjusting the rear end of the radius bar 7 upwardly and downwardly within the slot 8 to produce the results well known to those familiar with the art to which the invention relates, namely, increasing or diminishing the stroke of the valve rod r or reversing the movement thereof.

In addition to the parts so far described, the cross head H is provided with a depending plate 13 which is connected by a link 14 to the lower end of the lever 4. By this provision, the movement commonly known as the Walschear movement will be imparted to the valve rod r, and therefore to the valve within the casing c, thus varying the supply of steam to the cylinder C', to control not only the speed of the locomotive, but the direction in which the same travels, it being understood that the rod 12 must be operated to raise the radius bar in order to reverse.

Long and continual use of the structure so far described has set forth the need of some means whereby the lead of the valve rod *r* may be varied simultaneously with adjusting the radius bar 7. Numerous attempts have been made to accomplish this end, but since the majority of such attempts have been practical failures, I have devised the structure now to be described which I deem will successfully accomplish the object for which it is designed.

Secured to the bracket 6 in any appropriate manner, is an upright guide 20 in which an upright stem 21 is mounted for vertical adjustment, the lower end of this stem being equipped with a segmental track 22, this track being here shown in the form of a plate having an arcuate slot. Adapted to travel longitudinally in respect to the track 22 is a shoe 23, this shoe being here shown as located within the arcuate slot, it being therefore seen that forward or rearward movement of such shoe will raise or lower the stem 21 as the case may be, this stem preferably rising above the guide 20 as shown. It will still further be seen, that if some connection be established directly between the track 22 or between the stem 21 and the lever 4, this lever will be adjusted vertically to vary the distance between its fulcrum or connection with the radius bar 7, and its sliding connection with the link 1 or rod *r*.

It is my intention to provide such a connection for producing the above suggested result, and for this purpose a link 24 is offset at its upper end and is either pivoted or otherwise attached to the upper end of the stem 21, while its lower end is pivoted at 25 to a bracket 26 secured to the lever 4. By this simple expedient, it will be readily understood that vertical adjustment of the stem 21 will likewise adjust the lever 4 vertically.

Hereinbefore, it has been suggested that means are provided whereby this vertical adjustment of the lever 4 is effected simultaneously with vertical adjustment of the radius bar 7. For this purpose, the horizontal arm 30 of a bell crank lever 31 is pivoted to a slide 32 mounted upon said radius bar, at one of its ends, while its other end is fulcrumed at 33 to a bracket 34 secured to the bracket 6, the upright arm 35 of said bell crank lever rising from the fulcrum 33 and being pivotally connected to the shoe 23. By this structure, it will be seen that vertical movement of the radius bar 7 will adjust the horizontal arm 30 of the bell crank lever vertically, this causing its upright arm 35 to move forwardly or rearwardly as the case may be, thus shifting the shoe 23 upon the track 22. As hereinbefore suggested, such shifting of the shoe in respect to the track either raises or lowers the latter and the lever 4, by the provision of the link 24 and bracket 26. If this bracket be raised from the position seen in Fig. 4 for instance, to that seen in Fig. 5, the distance between the fulcrum at the upper end of the lever 4 and between its connection with the link 1 will be increased as clearly shown, thus varying the lead of the valve simultaneously with the adjustment of the radius bar.

In the drawings, I have shown a number of positions of the various parts of the device, and have above described the operation which takes place when the lever 31 is moved from an inclined position to a horizontal position, this description and illustration being thought to be ample to clearly explain the operation of the invention to those skilled in the art to which the same relates.

I have described my invention with considerable detail and have set forth certain specific embodiments for carrying out the objects of the invention, but it will be clearly understood that the essential parts of the invention are a valve operating rod, a lever connected therewith to move transversely in respect thereto, a movable fulcrum for the lever, and means whereby said lever may be oscillated to operate the valve, in combination with a segmental track disposed transversely to the lever and connected therewith (by any appropriate means), a shoe engaging said track and mounted for longitudinal movement in respect thereto, and appropriate means to impart such movement to said shoe. This structure may be embodied in a number of ways and may be employed either in connection with the radius bar or separate therefrom, it being therefore understood that I need not be limited to the specific details of construction described, otherwise than as set forth in the appended claims.

I claim:

1. The combination with a valve rod, a lever disposed at any angle thereto, connected therewith and shiftable transversely thereof, a fulcrum for the lever movable therewith, and means whereby said lever may be oscillated to operate the valve rod, of an arcuate track disposed transversely of the lever and connected therewith, a shoe engaging said track and mounted for longitudinal movement in respect thereto, and means to impart such movement to said shoe to shift the lever transversely of the valve rod, thus varying the distance between the fulcrum of said lever and its connection with said valve rod, to vary the movement of the latter.

2. The combination with a valve rod, a lever disposed at an angle thereto, connected therewith and shiftable transversely thereof, a fulcrum for the lever movable therewith, and means whereby said lever may be oscillated to operate the valve rod, of an arcuate track disposed transversely of the lever and connected therewith, a shoe engaging said track, and a lever on which said shoe is mounted, whereby it may be adjusted longitudinally upon said segmental track to shift the valve operating lever transversely in respect to the valve rod, thus varying the distance between the fulcrum of said lever and its connection with said rod.

3. The combination with a valve rod, a lever disposed at an angle thereto, connected therewith and shiftable transversely thereof, a fulcrum for the lever movable therewith, and means whereby said lever may be oscillated to operate the valve rod, of an arcuate track disposed transversely of the lever and located at a point spaced from one end thereof, a link connecting said track with said lever, a shoe engaged with the track to move longitudinally in respect thereto, and means whereby such movement may be imparted to said shoe to adjust the lever transversely in respect to the valve rod, thus varying the distance between its fulcrum and its connection with said rod.

4. The combination with a valve rod, a lever disposed at an angle thereto connected therewith and shiftable transversely thereof, an adjustable reciprocating radius bar to which said lever is fulcrumed at one end, and means to reciprocate its other end, of mechanism to shift said lever transversely of the valve rod, and means connecting said mechanism and said radius bar to adjust said mechanism simultaneously with the adjustment of said bar, thereby shifting the lever transversely in respect to the valve rod, to vary the distance between the fulcrum of said lever and its connection with said rod.

5. The combination with a valve rod, a valve operating lever disposed at an angle thereto, connected therewith and shiftable transversely thereof, an adjustable reciprocating radius bar to which said lever is fulcrumed at one end, and means to reciprocate its other end, of mechanism to shift said lever transversely of the valve rod, and a lever to operate said mechanism having a loose connection with the radius bar, whereby adjustment of the latter will likewise adjust said mechanism to shift the valve operating lever transversely in respect to the valve rod for the purpose set forth.

6. The combination with a valve rod, a valve operating lever disposed at an angle thereto, connected therewith and shiftable transversely thereof, an adjustable reciprocating radius bar to which said lever is fulcrumed at one end, and means to reciprocate its other end, of mechanism to shift said lever transversely of the valve rod, a lever for operating said mechanism, and a slide on the radius bar to which this lever is connected, whereby adjustment of said bar will simultaneously adjust the valve operating lever transversely of the valve rod.

7. The combination with a valve rod, a lever disposed at an angle thereto loosely connected therewith and shiftable transversely thereof, a movable fulcrum for said lever, a segmental track connected with said lever and disposed transversely thereof, a shoe engaged with said track and adapted to be moved longitudinally in respect thereto, a vertically adjustable radius bar carrying the fulcrum of said lever, and means connecting said shoe and said radius bar, whereby adjustment of the latter will simultaneously adjust the former longitudinally of said track.

8. The combination with a horizontal valve operating rod, an upright lever loosely connected therewith to move vertically in respect thereto, means to oscillate the lower end of said lever, a vertically adjustable radius bar to which the upper end of said lever is fulcrumed, a bracket rising to a point above the lever, an upright guide carried by said bracket, an upright stem mounted for vertical adjustment in said guide, a segmental track carried by said stem, a link connecting the stem and the lever, whereby vertical adjustment of said stem will simultaneously adjust said lever, a second bracket secured to the first named bracket, a bell crank lever fulcrumed at its angle to said second bracket, a shoe carried by the upright arm of said bell crank and engaged with said segmental track, the other arm of said lever lying substantially parallel with the radius bar, and a loose connection between said last named arm and said bar, substantially as and for the purpose set forth.

9. In combination, a valve rod, a lever disposed at an angle thereto, loosely connected therewith, and shiftable transversely thereof, a movable fulcrum for said lever, an arcuate track connected with said lever and disposed transversely thereof, a shoe engaged with said track and movable longitudinally in respect thereto, a vertically adjustable radius bar carrying the fulcrum of said lever, an angular lever to which the shoe is connected, a connection between said angular lever and the radius bar, whereby adjustment of the latter will simultaneously adjust the former longitudinally of the track, thereby shifting the valve operating lever transversely of the valve rod, and means to oscillate said last named lever.

10. In combination, a valve rod, a lever disposed at an angle thereto, loosely connected therewith, and shiftable transversely thereof, a movable fulcrum for said lever, an arcuate track connected with said lever and disposed transversely thereof, a shoe engaged with said track and shiftable longitudinally in respect thereto, a vertically adjustable radius bar carrying the fulcrum of said lever, an angular lever carrying the shoe, a slide on the radius bar to which said angular lever is connected, whereby adjustment of the latter will simultaneously shift the shoe longitudinally of the track to shift the valve operating lever transversely of the valve, and means for oscillating said last named lever.

In testimony whereof I have hereunto set my hand in presence of two subscribing witnesses.

THOMAS ERNEST PARADISE.

Witnesses:
N. M. ELSTAD,
GEO. H. CLATH.

Copies of this trade-mark may be obtained for five cents each, by addressing the "Commissioner of Patents, Washington, D. C."